US007006796B1

(12) United States Patent
Hofmann et al.

(10) Patent No.: US 7,006,796 B1
(45) Date of Patent: Feb. 28, 2006

(54) OPTIMIZED COMMUNICATION SYSTEM FOR RADIO-ASSISTED TRAFFIC SERVICES

(75) Inventors: Thomas Hofmann, Berlin (DE); Tanja Woywod, Berlin (DE); Marc Thom, Berlin (DE); Fabrice Stein, Berlin (DE); Volker Pliquett, Berlin (DE); Detlef Kendelbacher, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/743,215

(22) PCT Filed: Jun. 28, 1999

(86) PCT No.: PCT/DE99/02026

§ 371 (c)(1),
(2), (4) Date: Apr. 12, 2001

(87) PCT Pub. No.: WO00/02758

PCT Pub. Date: Jan. 20, 2000

(30) Foreign Application Priority Data

Jul. 9, 1998 (DE) ........................................ 198 32 594

(51) Int. Cl.
*H04B 7/00* (2006.01)

(52) U.S. Cl. ........................ 455/66.1; 455/74; 455/519; 340/905

(58) Field of Classification Search ..................... 455/7, 455/16, 66.1, 74, 403, 519, 517; 340/904, 340/905
See application file for complete search history.

(56) References Cited

U.S. PATENT DOCUMENTS

| | | | | | |
|---|---|---|---|---|---|
| 4,748,655 | A | | 5/1988 | Thrower et al. | |
| 4,750,129 | A | * | 6/1988 | Hengstmengel et al. .... | 701/117 |
| 5,740,046 | A | * | 4/1998 | Elestedt ...................... | 701/117 |
| 5,786,998 | A | * | 7/1998 | Neeson et al. ................ | 701/35 |
| 6,067,008 | A | * | 5/2000 | Smith ......................... | 340/438 |
| 6,311,060 | B1 | * | 10/2001 | Evans et al. ............. | 455/426.1 |

FOREIGN PATENT DOCUMENTS

| | | | |
|---|---|---|---|
| DE | 195 33 546 | C1 | 9/1995 |
| DE | 196 28 426 | A1 | 7/1996 |
| DE | 196 51 544 | C2 | 12/1996 |
| DE | 197 21 127 | A | 5/1997 |
| DE | 197 21 246 | A1 | 5/1997 |
| EP | 691 27 737 | T2 | 8/1991 |
| EP | 0 710 043 | A1 | 5/1996 |
| EP | 0 726 689 | A2 | 8/1996 |

* cited by examiner

*Primary Examiner*—Nguyen T. Vo
*Assistant Examiner*—Nhan T Le
(74) *Attorney, Agent, or Firm*—Morrison & Foerster LLP

(57) ABSTRACT

An optimized communications system for radio-assisted traffic services such as railroad services. In addition to the fixed-position central services and the fixed-position decentralized control centers, one or more decentralized gateway computers are introduced into the traffic network, with the communication between the mobile objects and the fixed-position objects being provided via the gateway computers.

3 Claims, 3 Drawing Sheets

OPTIMIZED COMMUNICATION SYSTEM FOR RADIO-ASSISTED TRAFFIC SERVICES

This application claims priority to International Application No. PCT/DE99/02026 which was published in the German language on Jun. 28, 1999.

TECHNICAL FIELD OF THE INVENTION

The invention relates to communications system, and in particular, to an optimized communications system for radio-assisted traffic services such as railroad services.

BACKGROUND OF THE INVENTION

Point-based or line-based train influence is used for controlling railroad operations. In point-based train influence, limited amounts of specific information items at fixed-position influencing devices is transmitted to vehicles moving past the devices. The information items may be evaluated, and if necessary, processed further at the device. In line-based train influence, more information can be exchanged for greater vehicle control and monitoring. Information can be continuously transmitted from a section of the track to the vehicles and, if necessary, in the opposite direction. Information is normally transmitted by means of linear conductors laid in the track, to which at least individual vehicles of the trains passing through that section are inductively coupled. Due to the complexity of installation, the operation and maintenance of the linear conductors laid in the track is considerable. For this reason, the prior art contemplates data which is transmitted between the individual subscribers by radio. A mobile radio system can be used for this purpose, as is already used for voice and data transmission and is described in EP 0 726 689 A2. The data to be transmitted for controlling railroad vehicles is, in contrast to voice radio data, safety-relevant since it affects the vehicle control directly. Care must therefore be taken in a suitable way to ensure that the data cannot be corrupted or lost on their way from the data source to the data sink. Cryptographic methods are nowadays widely used for the security of such data.

One special feature of railroad operation is that the data to be transmitted to the trains are produced in a decentralized manner by individual control stations or control points. Data transmitted via linear conductors to a train is typically linked to a single control point and, on entering a subsequent section region, is automatically changed over to the control point responsible for that section. With radio train influencing, this automatic association, which is dependent on the decentralized features of the rail system, with the respectively responsible control point is no longer provided. In fact, the vehicle or the control point responsible for the vehicle for this purpose, and on the basis of the known location of the vehicle on the section, either has to request the control center set up a link to the train which is approaching its section region, or cause the vehicle to set up this link. A specific time interval in the order of magnitude of up to 10 s is in each case required for this purpose. In this time, the locomotive of a train is still linked to the control center of the section region over which it is travelling and is thus busy with setting up a link to the control center of the next region. The vehicle needs to have at least two radios for this purpose.

One very major problem with regard to data transmission in decentralized systems, such as railroad systems, is also presented by the central services, for example those for disposition and central diagnosis. Special radio channels are either provided for these central services, although this is scarcely feasible owing to the limited resources, or else these central services communicate with the trains via the communications modules of the decentralized controllers. In the latter case, however, the link between the central services and the trains must be continuously readjusted to match the current locations of the trains. That is, the data for the central services have to be continually switched to the communications modules of the adjacent control centers. This results in gaps in the transmission of data, in particular due to synchronization processes, in the order of magnitude of several seconds. Furthermore, a disadvantage of this constellation is that central services which are making a request to a vehicle must first of all determine which control center is currently linked to the relevant vehicle.

In a central communications device according to DE 197 21 246, these disadvantages are avoided by introducing an additional central gateway computer which allows a continuous link to the trains, which are permanently assigned to the gateway computer. The change in the link to the decentralized objects in this case takes place only on the fixed side between the gateway computer and the decentralized object. The accessibility of mobile and fixed objects is in this case provided by a fixed relationship between the mobile object and the gateway computer.

This solution has the disadvantages of long communications paths between mobile and fixed objects due to the introduction of a fixed-position central gateway computer, via which the communication with the mobile subscriber takes place irrespective of its location. Furthermore, the relationships between the mobile objects and the gateway computers associated with them have to be set up and maintained in the vehicle and in the fixed-position gateway computer.

In summary, problems with the known prior art are that, in solutions based on the decentralized solution approach, central objects have the problem of determining those decentralized objects which have a link to the train, in order to connect to this link. Unknown mobile objects cannot be accessed using this method since no information is available about their location in the fixed-position objects. When the responsible decentralized object changes, a new link is set up to the next decentralized object. A second mobile radio is required to do this. All the links of the central objects must likewise be changed to the new radio link (hopping).

In implementations based on the central solution approach, each train has a fixed substitute in a gateway computer on the section side (fixed relationship between the mobile object and the gateway computer). Consequently, calls and data always have to be passed via a fixed-position node, irrespective of where the train is located. The resultant communications paths are consequently long, resulting in high operating costs. Furthermore, the substitute relationships to the mobile objects have to be configured and maintained individually in each gateway computer and each mobile object, which leads to high engineering and maintenance costs.

SUMMARY OF THE INVENTION

In one embodiment of the invention, there is an optimized communications system for radio-assisted traffic services for radio transmission of data between mobile objects and central services and fixed-position objects, which have decentralized control centers, using at least one gateway computer. Communication between the mobile objects and the fixed-position objects is implemented via the gateway computers such-that for the mobile objects which communicate with the gateway computers, one substitute object is in each case set up in the gateway computer and in the fixed-position objects. For the fixed-position objects which communicate with the gateway computers, substitute objects are set up directly in the gateway computer or indirectly via at least one information server, and an when an update process is used, the substitute information in the gateway computer and in the fixed-position objects is updated directly between the substitute objects in the gateway computer and the fixed-position objects, or indirectly between the gateway computer and the information server. In one aspect of the invention, if information servers are connected between the gateway computers and the central services as well as decentralized control centers, the update information is cascaded, and compressed information about accessible mobile objects is produced in the information server.

In another aspect of the invention, the compressed information can be called by fixed-position objects.

In still another aspect of the invention, the information servers actively communicate with fixed-position objects and filter and/or distribute update information.

BRIEF DESCRIPTION OF THE DRAWINGS

The invention will be described in more detail in the following text with reference to exemplary embodiments, at least some of which are illustrated in the figures, in which.

DETAILED DESCRIPTION OF THE INVENTION

Figure 1:
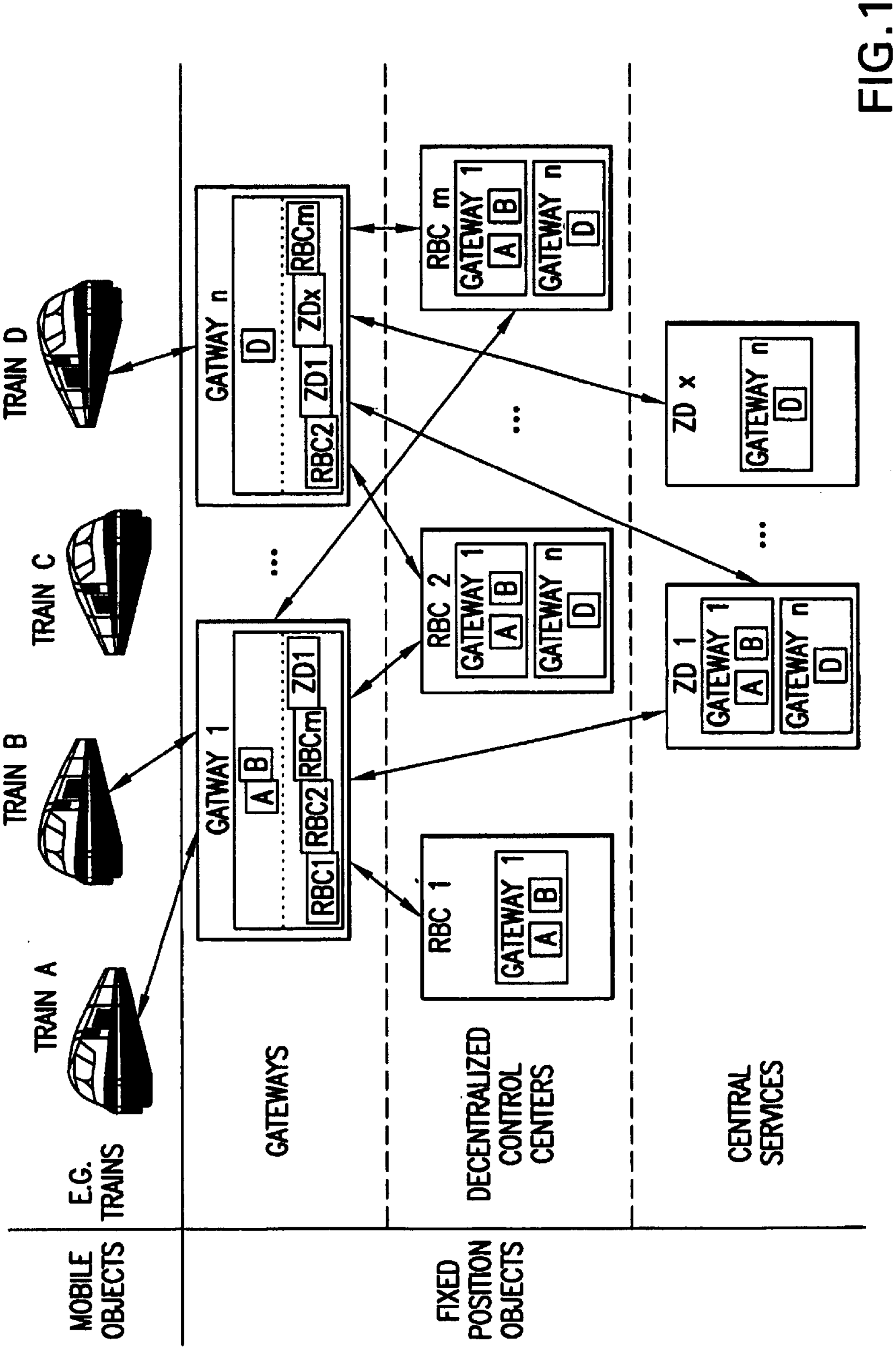
FIG. 1 shows a variant of optimized radio communications by means of a decentralized link map.

The invention relates to an optimized communications system for radio-assisted traffic services which, using simple means, allows reliable data traffic via effective communications paths with only one radio transmission channel between the mobile objects and the fixed-position objects, and which minimizes the outlay for setting up the system, updating the system and maintenance of the system.

One particular advantage of the invention is that, in addition to the fixed-position central services and the fixed-position decentralized control centers, one or more decentralized gateway computers are introduced into the traffic network, with the communication between the mobile objects and the fixed-position objects being provided via the gateway computers, in such a manner that for the mobile objects which communicate with the gateway computers, one substitute object is in each case set up in the gateway computer and in the fixed-position objects, and for the fixed-position objects which communicate with the gateway computers, substitute objects are set up directly in the gateway computer or indirectly via at least one information server, and using an update process, the substitute information in the gateway computer and in the fixed-position objects is updated directly between the substitute objects in the gateway computer and the fixed-position objects, or indirectly between the gateway computer and the information server.

For example, the gateway computers can be arranged in the vicinity of switching nodes, in order to save cable runs.

The communication between mobile and fixed-position objects is controlled via the gateway computers. The initiative for communication can in this case originate from the mobile end, from central services or from decentralized control centers, independently.

In addition to the decentralized gateway computers, information servers can be set up where required in the railroad network which, as fixed-position objects, can likewise communicate with gateway computers, central services and decentralized control centers.

In order to allow all the links between a mobile object and various fixed-position objects to be handled using only one radio channel, both the mobile and the fixed-position end select a common gateway computer for communication, temporarily and independently on one another.

Setting up substitutes for mobile and fixed-position objects in the gateway computer and updating them in the fixed-position objects ensures that the objects can access one another at any time via a common gateway computer. Mobile objects can access all the fixed objects which are mapped as substitutes in the gateway computer via one radio channel. Independently of one another, fixed-position objects can use the substitute map to select the correct gateway computer which is the substitute object for the vehicle, for example the train, and can thus use a common radio channel to the mobile object.

A further major advantage is that fixed-position objects do not need to start to search for a gateway computer via which the mobile subscriber may possibly be communicating at the time when they have the requirement to communicate with mobile objects (no polling of gateway computers required). Since the information about the communication between the gateway computer and the mobile objects is available, the fixed-position object can immediately select the correct gateway computer for connection to the existing radio link to the mobile object.

Furthermore, the fixed-position object can immediately decide whether the desired mobile subscriber is currently communicating with any gateway computer at all. If this is not the case, any desired gateway computer can be selected for communication (possibly based on criteria relating to an optimum communication path length).

A further advantage is that the described communications system can also be used to access mobile subscribers which are unknown to the fixed-position objects (dynamic telephone directory).

The update process optimizes the information transmission in that the only fixed objects which are informed are those which are also registered in the gateway computer and have a substitute object. Furthermore, only change messages are transmitted between the gateway computer and the registered fixed objects, so that the information interchange is also optimized in this respect. The updating information can, if necessary, be preprocessed and can be transmitted to the objects without any link to the time at which they were created, thus providing better distribution of network loads.

No data describing any association between gateway computers and objects need be stored in the decentralized gateway computers or in the mobile objects (no engineering definition).

The traffic network may comprise any desired number of decentralized gateway computers and information servers, and the network can be expanded as required.

The requirements for functionality of the traffic network are minimal due to the introduction of the decentralized, optimized process (for example no location updating is required in the fixed network).

If additional information servers are connected between the gateway computers and railroad services, there is a further advantage in minimizing information transmission by means of cascading. In this situation, when change reports occur, each traffic service no longer need be informed of them directly by means of an update protocol, and the correction is instead stored centrally in the information server and can be called up when required by the traffic services. The dynamic information for gateway computer selection, if necessary organized on the basis of the selection criteria, can thus be provided centrally, with minimum communication complexity. This avoids redundant information in the fixed-position objects.

The present communications system allows the operation of mixed structures. Information servers can provide information functions for specific traffic services or specific mobile subscribers (for example trains in a generic sense) and thus minimize the update communication complexity, for example in the case of occasional communication with mobile subscribers. In parallel with this, a direct update process by means of gateway computers can be provided for further fixed-position traffic services or on the basis of defined selection criteria, for example for frequent communication with mobile subscribers. The structures and the communication can thus be matched to the traffic concern requirements.

Based on the example of railroad service, the communications system distinguishes between three components:

a) mobile objects (for example trains),
b) fixed-position gateway computers,
c) fixed-position objects (central railroad services, decentralized control devices or information servers).

As illustrated in FIG. 1, a substitute object is set up in the gateway computer for mobile objects which communicate with a gateway computer; a substitute object is likewise set up in the gateway computer for fixed-position objects which communicate with the gateway computer, and information about substitutes for mobile objects for this gateway computer set up in each fixed-position object which has a substitute object in a gateway computer.

An update process between the substitute objects in the gateway computer and the fixed-position objects updates the substitute information in the gateway computer and in the fixed-position objects when changes occur (for example setting up a new substitute object on establishing radio communication with another train.) The update process is optimized to the requirements for delay time, throughput etc.

The update process means that up-to-date information is always available in the fixed-position objects relating to which gateway computers are communicating with which mobile subscribers. Central services and decentralized control devices can use the available information to decide whether the mobile subscriber is at present registered in one of the known gateway computers and, if so, in which gateway computer. This decision can be used to select the correct gateway computer which is already communicating with that train. If no substitute information about the mobile subscriber is available, a specific selection of the gateway computer can be made (for example with the optimum communication path as the criterion).

Figure 2:
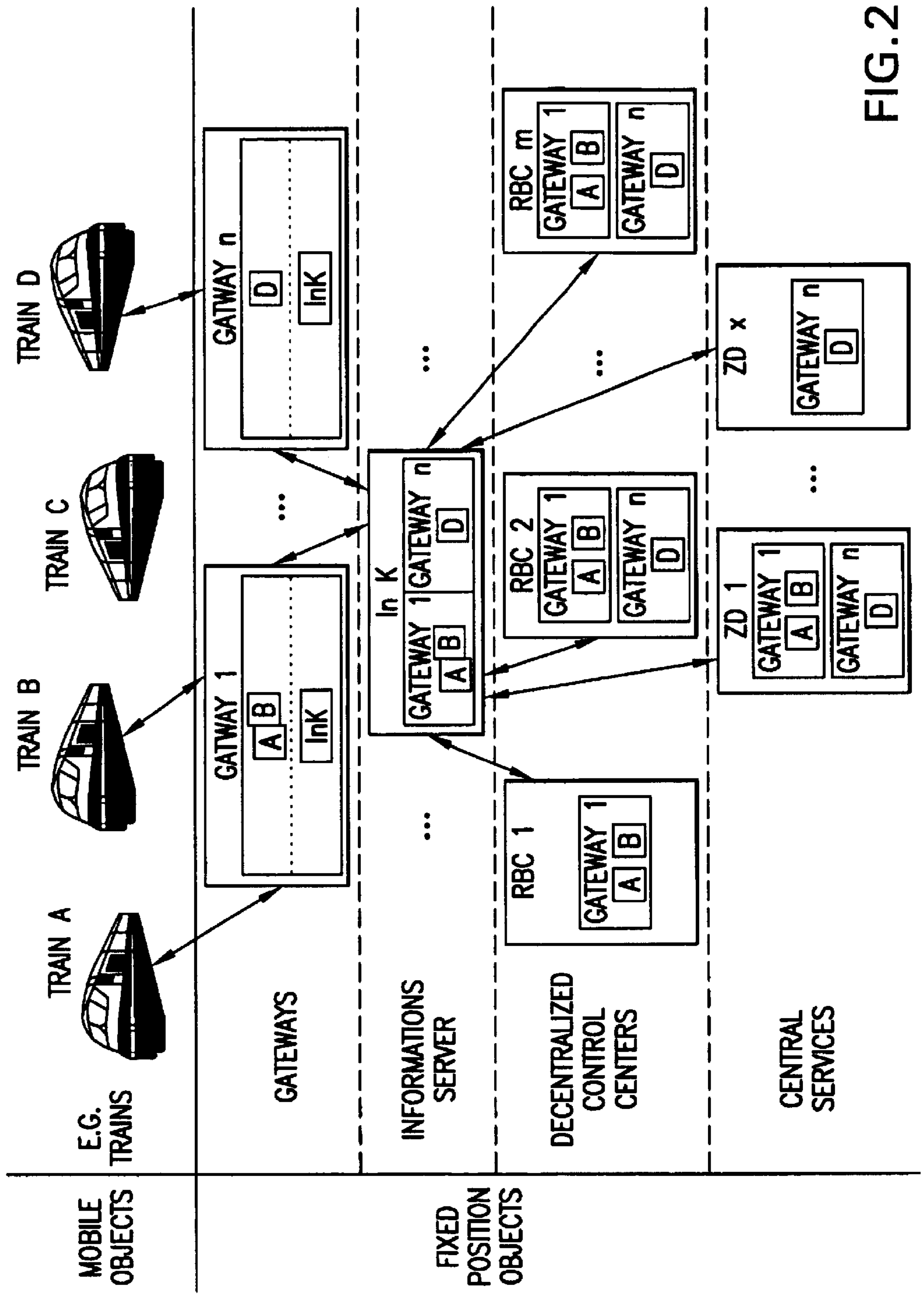
FIG. 2 shows a variant of optimized radio communications by means of a central link map.
Figure 3:
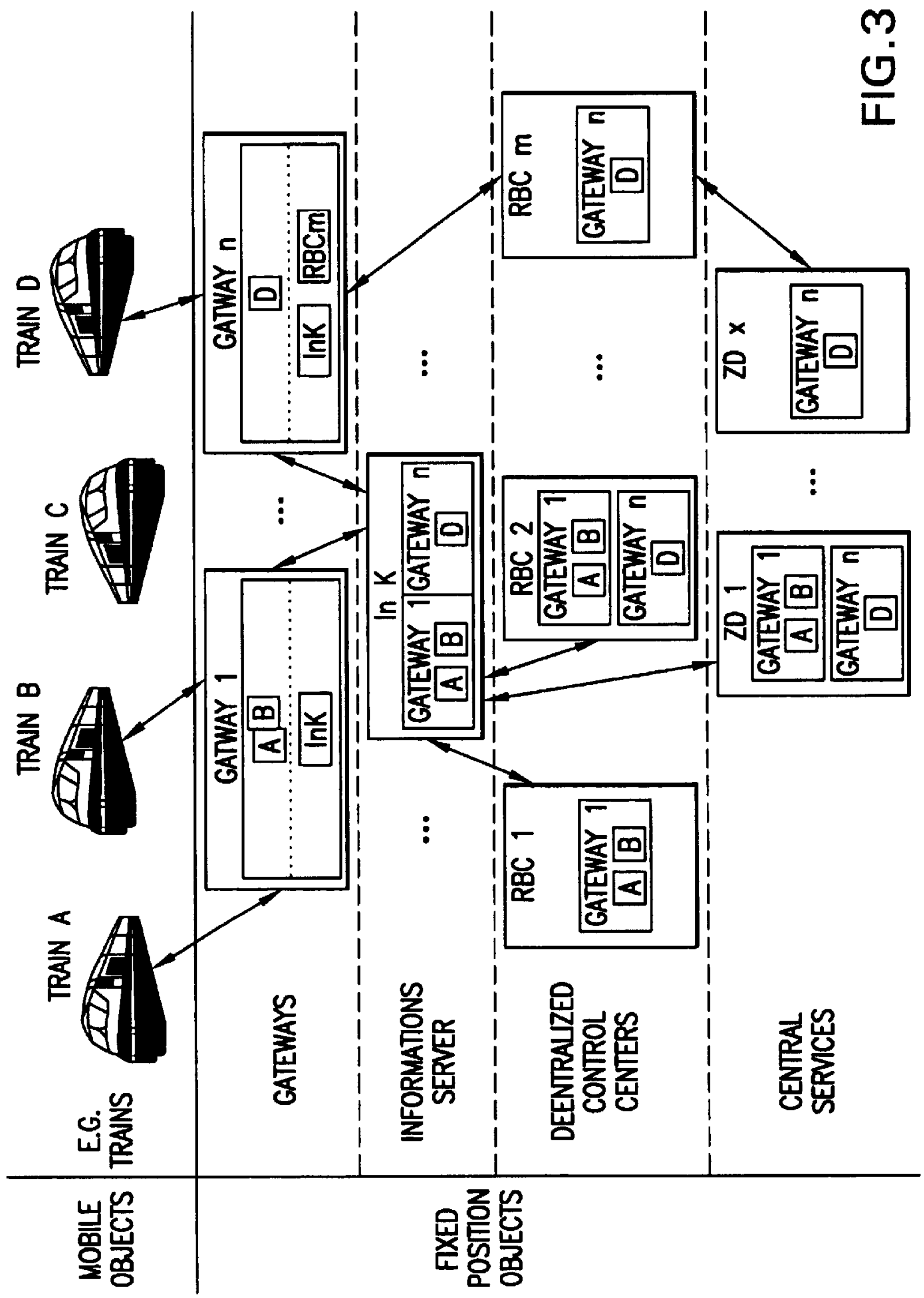
FIG. 3 shows a variant of optimized radio communications by means of a central and decentralized link map.

Information servers can be included for cascading the update information, as illustrated in FIG. 2. In this case, the information relating to accessible mobile objects and associated gateway computers is stored in an intermediate, fixed-position information server rather than in the central services and decentralized control centers. An update process is used between the information server and gateway computer. Compressed information about accessible mobile subscribers for different gateway computers is thus available in the information server. This information can be called up by other fixed-position objects which wish to access mobile communications subscribers (information function). If desired, the information server can take the initiative for communication with fixed-position objects, and can filter and distribute update information (change service). Mixed variants with and without the interposition of information servers are also feasible, as shown in FIG. 3. The respective configuration depends on the communication requirements for the applications (for example communication frequency, time requirements).

There are no limits to the number of mobile and fixed-position substitute objects per gateway computer. There are likewise no limits to the number of gateway computers and information servers which can be installed in a railroad network. The method for selection of gateway computers is the same for central servers and decentralized control devices.

Dynamic functions of the communications system are described in the following text.

I. SIGNALING

IA. Setting up Communication from the Mobile End

Communication is set up by the network (on the basis of defined criteria) selecting a decentralized gateway computer. A substitute object for the mobile subscriber is set up in the gateway computer. Controlled by the update protocol, update information about the substitute object is then distributed to all the registered fixed-position objects. These objects thus have the information about the accessibility of the mobile object and about the associated decentralized gateway computer.

IB. Setting up Communication from the Mobile End

When a mobile object ends communication with the first gateway computer, the substitute object in the first gateway computer is deleted. The update process updates the substitute information for all the registered fixed-position objects.

IC. Setting up Communication from the Fixed-position End

Any fixed-position object can set up a link to a gateway computer. If there is no need for every fixed-position object to communicate with every gateway computer, there may be limitations in the fixed-position object relating to which gateway computers links should be set up to. Furthermore, there may also be limitations on the selection and scope of the update information which is intended to be interchanged between a gateway computer and the fixed-position object (for example, only update information relating to high-speed trains may be transmitted, on a selective basis, to the fixed-position object).

When a fixed-position object initiates communication with a gateway computer, a substitute object is set up in this gateway computer. A profile about the desired update information can also be set up. The gateway computer then uses the update protocol to transmit the up-to-date map of the mobile substitute objects (if appropriate selected on the basis of the update profile criteria) to the fixed-position object. The fixed-position object thus has the information about the mobile objects which can be accessed from that gateway computer. On the basis of the available signaling information, a fixed-position railroad service can set up a data link to the mobile object via the gateway computer that is currently being used by that mobile object.

The fixed-position object which sets up a link to a gateway computer may also be an information server. In this case, the directory of substitutes for mobile objects for that gateway computer is set up in the information server.

Central services and decentralized control centers can either communicate directly with a gateway computer or can receive information relating to mobile objects in the gateway computers via information servers. If an information server is used, the communication between the information server and the gateway computer is handled in the same way as that between the railroad service and the gateway computer without any information server. The fixed-position railroad services are in this case not included in the update process between the information server and the gateway computer. The process of setting up a link from the fixed-position object to the mobile object is subdivided into two steps where the information server is used.

First: Transmission of signaling information between a fixed-position object and an information server. The purpose of this communication is to search for a destination (information about the gateway computer to be selected). Communication between a fixed-position object and an information server may either be initiated by the railroad service (information call), or may be on the initiative of the information server (change service). Once signaling has taken place, the communication between the fixed-position railroad service and the information server is ended.

Second: Setting up the data link between the fixed-position railroad service and a mobile object via the gateway computer which has been determined.

ID. Terminating Communication from the Fixed-position End

When a fixed-position object ends communication with a gateway computer, the update process for this fixed-position object is at an end. The substitute for the fixed-position object in the gateway computer is deleted. Information relating to changes of substitute objects in the gateway computer will in future no longer be transmitted to that fixed-position object.

II. DATA TRANSMISSION

Three different types of data need to be transmitted:

IIA. Data between mobile objects and decentralized control devices

IIB. Data between mobile objects and central services

IIC. Signaling information between gateway computers, information servers and fixed-position objects (by means of update processes).

The application data traffic for IIA and IIB always passes directly via a gateway computer without the interposition of any information server. The transmission of the various types of data may be subject to different requirements. For example, the transmission of data between mobile objects and decentralized control devices may be subject to stringent time and availability requirements. Data type IIB (for example diagnosis), on the other hand, may have less stringent time requirements, and may have the character of bulk data. Data such as this can be selected, compressed and preprocessed in the gateway computer, if required. Transmission is likewise possible as a function of defined limit-value criteria or when a radio link is in existence for other applications and resources are available. The time of origin of the data can be decoupled from the time of transmission by intelligent preprocessing and buffering of data which are not time-critical. There is thus no need for data channels to be connected through directly, and this improves the load distribution in the network. The data for the update process IIC are not user data, but are auxiliary information for transmitting change messages between a gateway computer and the linked fixed-position objects (central services, decentralized control centers or information servers). If an information server is used, the update data are transmitted between the information server and the gateway computer. By accessing the up-to-date directories in the information server, fixed-position railroad services can determine the gateway computer responsible for a mobile object, and can then communicate with that mobile object via this gateway computer. Otherwise, the update data are transmitted directly between the gateway computer and the fixed-position railroad service.

The invention is not limited to the exemplary embodiments described here. In fact, further embodiment variants can be produced by combining and modifying the means and features, without departing from the scope of the invention.

What is claimed is:

1. A communications system for radio-assisted traffic services for radio transmission of data between mobile objects and central services and fixed-position objects, which have decentralized control centers, using at least one gateway computer, wherein communication between the mobile objects and the fixed-position objects is implemented via the at least one gateway computer such that for the mobile objects which communicate with the at least one gateway computer, one substitute object is set up in the at least one gateway computer and in the fixed-position objects, and for the fixed-position objects which communicate with the at least one gateway computer, substitute objects are set up directly in the at least one gateway computer or indirectly via at least one information server, using an update process, substitute information in the at least one gateway computer and in the fixed-position objects is updated directly between the substitute objects in the at least one gateway computer and the fixed-position objects, or indirectly between the at least one gateway computer and the information server, and wherein if information servers are connected between the at least one gateway computer and the central services as well as decentralized control centers, the update information is cascaded, and compressed information about accessible mobile objects is produced in the information server.

2. The communications system as claimed in claim 1, wherein the compressed information is configured to be called by fixed-position objects.

3. The communications system as claimed in claim 1, wherein the information servers actively communicate with fixed-position objects and filter and/or distribute update information.

* * * * *